United States Patent [19]

Yoshizumi

[11] Patent Number: 4,611,916
[45] Date of Patent: Sep. 16, 1986

[54] OPTICAL MEASURING APPARATUS

[75] Inventor: Keiichi Yoshizumi, Osaka, Japan

[73] Assignee: Matsushita Electric Industrial Co., Ltd., Osaka, Japan

[21] Appl. No.: 609,196

[22] Filed: May 11, 1984

[51] Int. Cl.[4] .............................................. G01B 9/02
[52] U.S. Cl. ..................................... 356/349; 356/360
[58] Field of Search ....................... 356/349, 359, 360

[56] References Cited

U.S. PATENT DOCUMENTS 4,139,304  2/1979  Redman et al. ....................... 356/358
4,148,587  4/1979  Erdmann et al. ................. 356/359 X
4,353,650 10/1982 Sommargren ................... 356/351 X Primary Examiner—Davis L. Willis
Assistant Examiner—Matthew W. Koren
Attorney, Agent, or Firm—Burgess, Ryan & Wayne

[57] ABSTRACT

In an optical measuring apparatus, measuring light having a frequency $f_1$ is focused and its beam spot irradiates a surface of an object fixed on a carrier. The carrier is shifted in a direction perpendicular to the optical axis of an objective lens to obtain measuring light reflected by the surface of the object. At the same time, reference light having a frequency $f_2$ irradiates a mirror mounted on the carrier to be substantially perpendicular to the optical axis of the lens to obtain reflected reference light. The reflected reference light is interfered with the reflected measuring light to detect a beat frequency to optically, precisely measure a shape of the surface of the object.

3 Claims, 10 Drawing Figures

OPTICAL MEASURING APPARATUS

BACKGROUND OF THE INVENTION

I. Field of the Invention

The present invention relates to a three-dimensional measuring apparatus for optically measuring with high precision the surface shape of a general free curved surface or a lens or mirror having an aspherical surface without contacting the surface to be measured and, more particularly, to an optical measuring apparatus for focusing a laser beam through an objective lens on an object surface to be measured and for detecting a Doppler shift in the frequency of the reflected laser beam which is caused by displacement of the object surface to be measured.

II. Description of the Prior Art

Laser interferometric measuring equipment using an optical heterodyne method is commercially available from Hewlett-Packard (Model HP5526A). At present, this model is known as the most precise measuring instrument which can be easily handled. In addition, this model can be installed on a three-dimensional carrier to constitute a three-dimensional measuring system or a highly precise lathe system.

In conventional optical measuring apparatuses, a corner-cube prism and a mirror are mounted on the carrier, and only the movement of the carrier is measured by a laser interferometer. In the case of the conventional three-dimensional measuring instrument, a measuring probe is shifted relative to the carrier along a surface of the object to be measured. In this case, both a contact type probe and a noncontact type probe are available. However, both can provide a measuring precision of only 1/10 of that in the laser interferometer.

SUMMARY OF THE INVENTION

It is a first object of the present invention to provide an optical measuring apparatus capable of directly measuring a surface shape of an object in accordance with laser interferometric measurement. In this apparatus, measuring light and reference light are used, the measuring light is focused and irradiates the surface of the object fixed on the carrier, and the carrier is moved along a direction perpendicular to the optical path of the measuring light. On the other hand, the reference light irradiates the surface on the carrier along a direction perpendicular to the optical path of the measuring light. A beat frequency between reflected light of the reference light and reflected light of the measuring light is detected, thereby measuring a surface shape of the object. However, the surface to be measured is not generally perpendicular to the optical path of the measuring light but is inclined with respect thereto. For this reason, the return optical path of the reflected light of the measuring light is deviated from the incident optical path thereof. As a result, the detected beat frequency has a small amplitude.

It is, therefore, a second object of the present invention to provide an optical measuring apparatus, wherein the light is reflected and passes along the same path as the incident light when an inclination of the surface to be measured falls within an aperture angle of an objective lens, thereby providing a larger allowance with respect to the inclination of the surface of the object to be measured.

When the surface to be measured comprises a surface such as a glass surface having a low reflectance or non-smooth surface such as a polished surface, a sufficient amount of reflected light cannot be obtained.

It is, therefore, a third object of the present invention to provide an optical measuring apparatus capable of measuring various shapes of surfaces with high precision by using a newly developed high-power laser source.

In order to achieve the above objects of the present invention, there is provided an optical measuring apparatus comprising: a light source for stably generating measuring light of a frequency $f_1$ and reference light of a frequency $f_2$ with high precision; first optical means for focusing the measuring light on a surface of an object fixed on a carrier; moving means for moving said carrier along a direction perpendicular to an optical path of the measuring light; controlling means for controlling to keep a constant distance between an objective lens of said first optical means and the surface of the object; second optical means for focusing the reference light on a mirror arranged on said carrier; and third optical means for interfering the measuring light reflected by the surface of the object and the reference light reflected by said mirror on a first photodetector. A beat frequency caused by the interference of the two reflected light components is detected to precisely measure the shape of the surface of the object.

There are also provided a plurality of second photodetectors or a second photodetector divided into a plurality of photodetecting elements for detecting a positional deviation of the reflected light which is caused by inclination of the surface of the object with respect to a plane perpendicular to the optical axis, and means for moving the objective lens in response to error signals obtained from the photodetector or photodetectors. Therefore, the allowance of inclination of the surface of the object with respect to a plane perpendicular to the optical axis is increased.

The above and other objects, advantages and features of the present invention will be apparent from the following detailed description taken in conjunction with the accompanying drawings.

Figure 1:
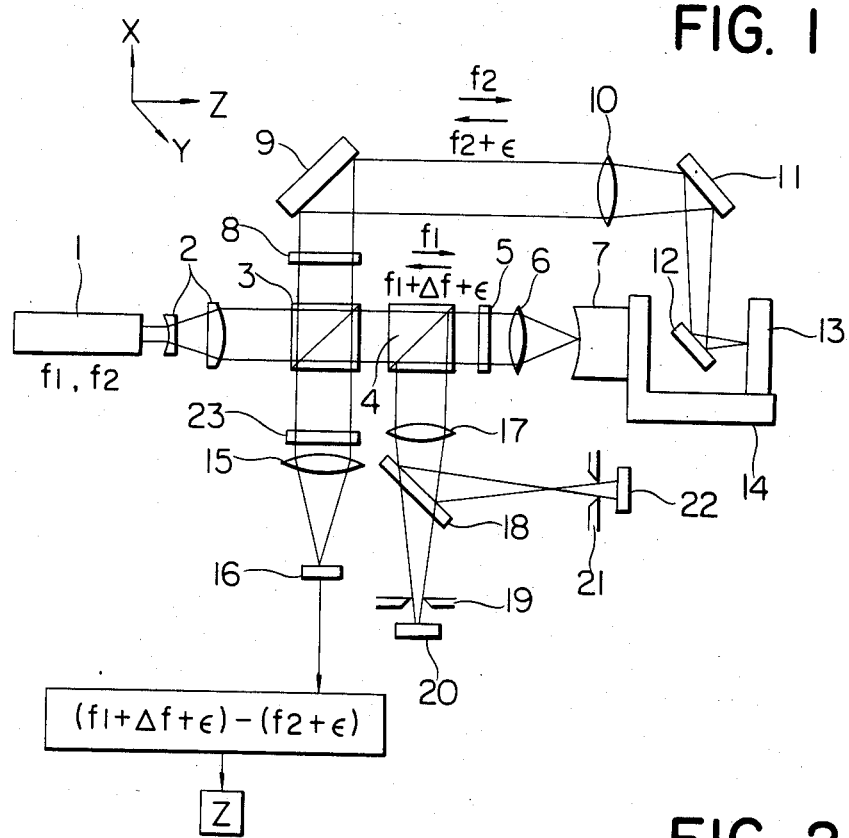
FIG. 1 is a schematic representation showing the overall configuration of an optical measuring apparatus according to a first embodiment of the present invention.

DETAILED DESCRIPTION OF THE PREFERRED EMBODIMENTS:

FIG. 1 shows an optical measuring apparatus according to an embodiment of the present invention. Referring to FIG. 1, a laser source 1 comprises an He-Ne laser and generates light components by applying a magnetic field along a direction perpendicular to the longitudinal direction of the laser housing. The two light components have oscillation frequencies $f_1$ and $f_2$ and polarization directions perpendicular to each other, respectively. These frequencies are very stable, as is described in detail by H. Takasaki et al., Appl. Opt. 19, 435 (1980). This laser has a higher power than the conventional laser, and the stability of the frequencies is given to be $10^{-9}$.

Reference numeral 2 denotes a beam expander. The laser beams from the laser source 1 are expanded to be collimated laser beams which have a width slightly smaller than an entrance pupil diameter of an objective lens 6. The light having the frequency $f_1$ is called measuring light and is polarized such that the electric field is parallel to the drawing surface and entirely passes through a polarization beam splitter 3. On the other hand, the light having the frequency $f_2$ is called reference light and is polarized along the direction perpendicular to the drawing surface and is entirely reflected by the polarization beam splitter 3. The measuring light is entirely transmitted through a polarizing prism 4 and passes through a $\lambda/4$ plate 5. The measuring light is then focused by the objective lens 6 and radiates a surface of an object 7 to be measured. The object 7 is fixed on a carrier 14 and can be reciprocally moved along the X and Y directions. The light reflected by the surface of the object passes through the objective lens 6 and then the $\lambda/4$ plate 5, so that the polarization direction of the reflected light is shifted by 90° from that of the incident measuring light. The polarizing prism 4 is designed such that a P-polarized wave is entirely transmitted through the prism 4 and an S-polarized wave is partially transmitted therethrough. Since the light reflected by the surface of the object is an S-polarized wave, only part of it is transmitted through the polarizing prism 4 and the remaining portion is reflected thereby. The light component reflected by the polarizing prism 4 is focused by a lens 17 and is split by a half mirror 18 into two split light components. The two split light components pass through circular apertures 19 and 21 disposed in front of and behind the in-focus points, respectively, and reach photodetectors 20 and 22, respectively. When an in-focus point is deviated from the surface point of the object 7, any one of the two split light components is partially cut off by the aperture 19 or 21 in accordance with the deviation direction. A difference occurs between the amounts of the two split light components incident on the photodetectors 20 and 22. When the difference is used as an error signal, and the objective lens 6 is shifted in the Z direction in accordance with the error signal, the beam spot is focused on the surface of the object. This focus detection method is described by Y. Fainman et al., Appl. Opt. 21, No. 17, P. 3200.

When the object is shifted along the X and Y directions, the frequency of the reflected measuring light is Doppler-shifted in accordance with a change in thickness of the object. If the frequency of the reflected light is given to be $(f_1 + \Delta f + \epsilon)$, the Doppler shift is given as $(\Delta f + \epsilon)$ where $\Delta f$ is the change in frequency due to a change in thickness of the object to be measured, and $\epsilon$ is a displacement of the carrier 14 along the Z direction. The Doppler shift is expressed in a precise manner as described above since the measuring apparatus of the present invention aims at highly precise measurement of 0.1 to 0.01 $\mu$m. For this reason, the carrier 14 must also be shifted with high precision. When the carrier 14 is actually shifted along the X and/or Y direction (i.e., within the X-Y plane), it is slightly deviated along the Z direction. In practice, it is difficult to limit the error along the Z direction to be less than 0.2 $\mu$m even if an air or oil bearing type carrier of the highest precision is used. Therefore, both changes in frequency due to the deviation along the Z axis and the thickness of the object must be considered to determine the Doppler shift. The reflected measuring light has a frequency of $(f_1 + \Delta f + \epsilon)$ and is entirely reflected by the polarization beam splitter 3 and reaches a photodetector 16 through a polarizing plate 23 and a lens 15.

On the other hand, the reference light is incident on a mirror 13 through a $\lambda/4$ plate 8, a mirror 9, a lens 10, and mirrors 11 and 12. The smoothness of the mirror 13 is given to be as precise as 0.01 $\mu$m. Therefore, the reflected reference light is subjected to Doppler shift consisting of only a deviation in the carrier 14 along the Z axis. As a result, the frequency of the reflected light of the reference light becomes $(f_2 + \epsilon)$. The focal length of the lens 10 is sufficiently great, so that the depth of the focal point is sufficiently large. In addition, the deviation in the carrier 14 along the Z direction is very much smaller than the depth of focal point. Thus a focus servo mechanism need not be used for the reference light. The reflected reference light returns along the incident optical path thereof and is transmitted through the $\lambda/4$ plate 8. The polarization direction of the reflected reference light is shifted through 90° from that of the incident reference light. This reflected light is entirely transmitted through the polarization beam splitter 3 and is incident on the photodetector 16. The polarization directions of the measuring light and the reference light are perpendicular to each other, so that only 45°-components thereof are transmitted through the polarizing plate 23, matching their polarization directions. As a result, a beat frequency $(f_1 + \Delta f + \epsilon) - (f_2 + \epsilon) = f_1 - f_2 + \Delta f$ is detected by the photodetector 16. The term $(f_1 - f_2)$ can be given such that the output light components from the laser source 1 are partially separated and are subjected to subtraction. Therefore, the change in frequency $\Delta f$ which corresponds to a change in thickness of the object can be detected.

When the reflecting surface is shifted at a velocity v along the Z direction, the frequency of the reflected light is given to be $f_1(1 - 2v/c)$ where c is the velocity of light and $f_1$ is the frequency of the incident light, and its Doppler shift is given to be $\Delta f = 2vf_1/c$. Therefore, a deviation along the Z axis of the carrier is given to be $\Delta Z = \int v dt = (c/2f_1) \int \Delta f dt$. In this case, the measuring precision depends on the stability of the frequency $f_1$. In other words, the stability of the frequency $f_1$ is given to be a measurement reliability factor.

Figure 2:
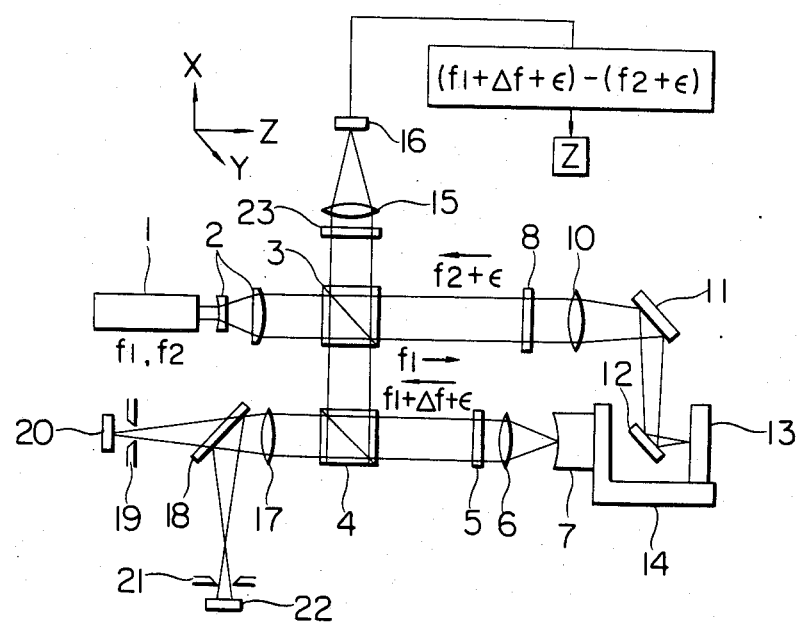
FIG. 2 is a schematic representation showing the overall configuration of a modification of the first embodiment.

As a modification shown in FIG. 2, when the polarizing prism 4 entirely reflects the S-polarized wave and only partially reflects the P-polarized wave (i.e., partially transmits the P-polarized wave), the difference between the optical paths of the reference light and the measuring light can be smaller than that in the arrangement shown in FIG. 1.

In the arrangement of the first embodiment, when the surface of the object to be measured is inclined, a problem occurs which will now be explained with reference to FIG. 3.

Figure 3:
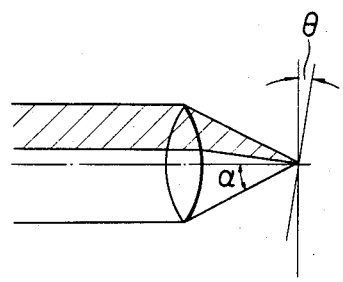
FIGS. 3 and 4 are respectively representations for explaining the deviation in reflected light when a surface of an object to be measured is inclined.
Figure 4:
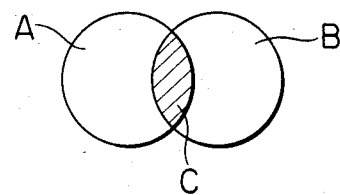
Figure 5:
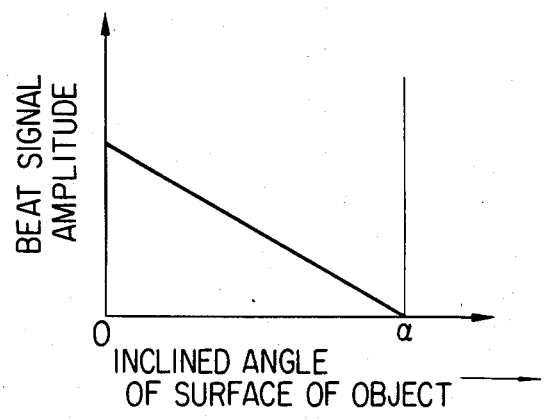
FIG. 5 is a graph for explaining the beat signal amplitude as a function of the inclined angle of the surface of the object.

FIG. 3 is a schematic representation showing the optical path when the surface of the object is inclined by an angle $\theta$ with respect to a plane perpendicular to the optical axis of the lens. The numerical aperture NA of the objective lens is given to be $\sin\alpha$. When the inclined angle $\theta$ falls within the angle $\alpha$, the reflected light can be incident on the objective lens. However, even if the inclined angle $\theta$ falls within the angle $\alpha$, the beat frequency amplitude becomes smaller than that of the case wherein the surface of the object is not inclined with respect to the plane perpendicular to the optical axis of the incident light, as shown in FIG. 5. The beat frequency amplitude is proportional to an overlapping area C of an aperture A of the objective lens and a distribution B of the reflected light. Therefore, when the numerical aperture of the objective lens is made larger, the allowable inclined angle is increased. When the incident light is incident at a width which is almost the same as that of the opening of the objective lens, the allowable inclined angle range is widened.

However, when the NA of the objective lens is increased, a working distance (i.e., distance between the lens and the object) is decreased. Therefore, when an inclined surface is to be measured, the lower end portion (FIG. 3) of the object lens is brought into contact with the object surface, which disables measurement. A specially designed objective lens is proposed as a long working distance lens wherein NA=0.6 and the working distance =3 mm. At the present time, it is impossible to prepare a lens which has a larger NA than that of the specially designed objective lens described above.

Figure 6:
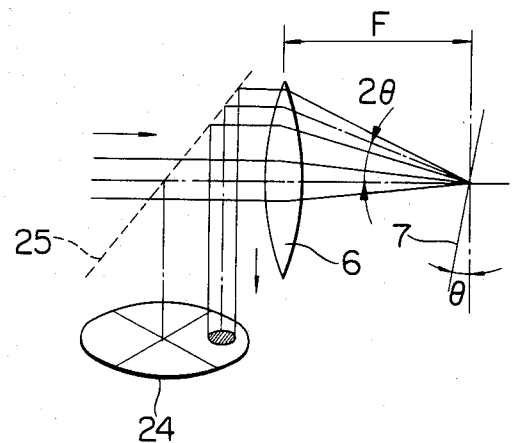
FIGS. 6 and 7 are respectively representations for explaining the principle of an optical system of an optical measuring apparatus according to a second embodiment.
Figure 7:
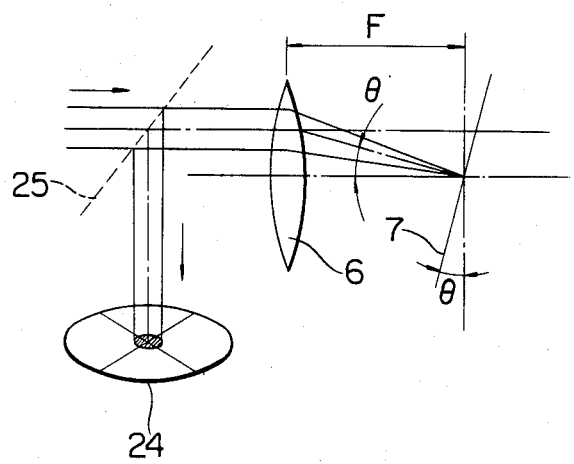
Figure 8:
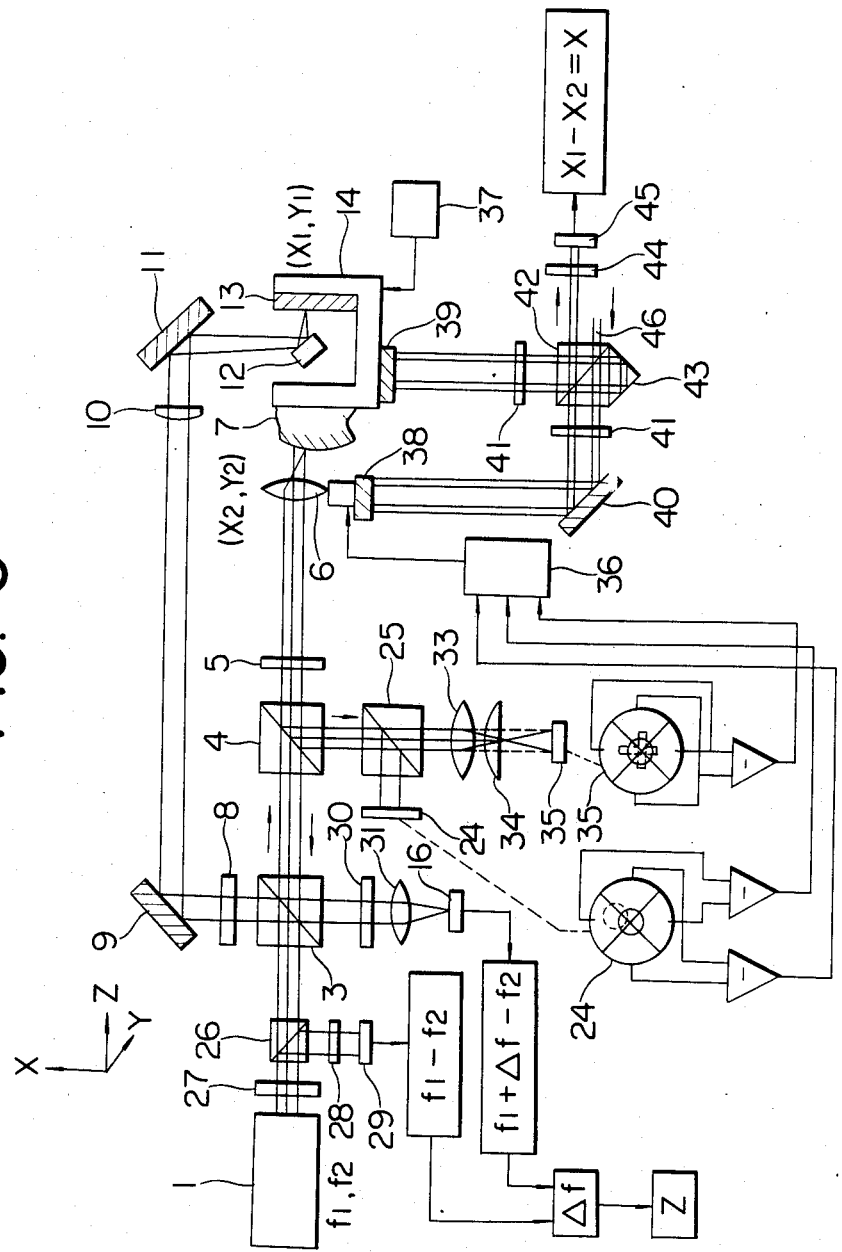
FIG. 8 is a detailed diagram of the optical measuring apparatus according to the second embodiment.

According to a second embodiment shown in FIGS. 6 to 8, even if the surface of the object is inclined, the reflected light is returned along the same optical path as the incident light. Therefore, the allowable inclined angle range of the object surface becomes widened.

The principle of the second embodiment will be described with reference to FIGS. 6 and 7. When the surface 7 of the object is inclined by an angle $\theta$, the reflected light is inclined by an angle $2\theta$. The central position of the reflected light passing through the objective lens 6 is deviated by $F\sin 2\theta$, where F is the focal length of the objective lens 6. However, if the objective lens 6 is moved by $F\sin\theta$ along the direction perpendicular to its optical axis, the optical path of the reflected light is aligned with that of the incident light. When a positional deviation in the reflected light occurs as shown in FIG. 6, part of the reflected light is incident on a four-split photodetector 24 to obtain an error signal, and an optical servo mechanism is driven in response to the error signal such that the objective lens 6 is moved along the direction perpendicular to its optical axis and that the optical path of the reflected light is aligned with that of the incident light, as shown in FIG. 7. It should be noted that the optical servo mechanism may be driven to shift the optical path of the incident light in the vertical direction with respect to the optical axis of the objective lens instead of shifting the objective lens along the direction perpendicular to its optical axis. The shape of the photodetector and the detection method of the error signal can be selected as needed. For example, when a four-split photodetector has an aperture at its center, and the aperture size is the same as the diameter of the incident light, the error signal can be obtained without separating the reflected light by a beam splitter 25. A commercially available position photodetector may be used in place of the above-mentioned detector. In such a position photodetector, a voltage appearing at both terminals changes in accordance with a light-receiving position.

FIG. 8 shows the overall configuration of an optical measuring apparatus according to the second embodiment of the present invention. In general, when the surface 7 of the object is deviated from the in-focus position, the optical path of the reflected light is deviated from that of the incident light, therefore it becomes impossible to detect the beat signal. In order to prevent this, according to this embodiment, the reflected light is focused by a lens 33 and a cylindrical lens 34 to generate an astigmatism, thereby allowing a four-split detector 35 to extract an error signal. A focus servo mechanism 36 is driven to parallel-shift the objective lens 6 or the object 7 along the optical axis of the lens 6. Extraction from the astigmatism is the most effective method of obtaining the error signal. However, a knife edge may also be used for this purpose. Alternatively, the reflected light can be split into two split beams, and pinholes are formed in front of and behind the in-focus points of these two split beams. In this case, a difference between the outputs (corresponding to the two split beams) from the respective photodetectors is detected as the error signal.

The focus servo mechanism for moving the objective lens 6 or the object 7 in accordance with an error signal comprises a mechanism using a motor and a feed screw driven thereby, or a mechanism using a linear motor.

According to the second embodiment, the inclined angle of the surface 7 of the object can be allowed to an extent corresponding to the angular aperture of the objective lens 6. When the objective lens 6 having an NA of 0.6 is used, the angular aperture forms an angle of 36° with respect to the optical axis of the objective lens 6. Therefore, the surface, which is inclined within the range of about ±30°, can be sufficiently measured. However, in this case, note that the diameter of the light beam incident on the objective lens 6 must be considerably smaller than the entrance pupil diameter of the objective lens 6. For example, when a spot size obtained at a position where the intensity of the parallel incident light having a Gaussian distribution is $1/e$ (e=2.718) is set to be one-third of the aperture diameter of the objective lens, the intensity of the light beam is reduced only by 40% to allow satisfactory measurement when the incident light is incident on and reflected by the surface 7 having the inclined angle range of ±30° by using the objective lens 6 with the NA of 0.6.

When the objective lens 6 is shifted in accordance with the inclination of the surface 7 of the object, the in-focus point is shifted corresponding to movement of the objective lens 6. This relationship can be entirely established when the incident light comprises parallel light. In the curved surface thickness measuring apparatus using the laser interferometer described above, the measuring point must be detected in the X-Y coordinate system.

In this case, the measuring point coordinates $(X_1-X_2, Y_1-Y_2)$ are given such that the amounts of displacement $(X_2, Y_2)$ of the objective lens 6 are subtracted from the amounts of displacement $(X_1, Y_1)$ of the object. On the other hand, when the incident light is parallel-shifted without shifting the objective lens 6, the measuring point is fixed.

In the second embodiment, the carrier 14 having the object thereon is shifted along the X and Y directions by a mechanism 37, and the objective lens is shifted along the Z direction. However, the optical system including the objective lens and the laser may be shifted along the X and Y directions and the object may be shifted along the Z direction to obtain the same effect as the second embodiment. This modification can be made in accordance with design convenience.

When a thickness Z of the object is measured, the X and Y coordinates of the measuring point must be precisely measured to improve measuring precision. For this purpose, the light of the frequency-stabilized Zeeman laser is partially separated. Alternatively, as shown in FIG. 8, the measuring light $f_1$ of light 46 from the light source is guided to be incident on a mirror 38 fixed together with the objective lens, and the reference light $f_2$ is guided to be incident on a mirror 39 fixed together with the object. The beat signal between the reflected light components of the measuring light and the reference light is detected by a photodetector 45, so that a difference (e.g., the coordinates (X,Y) of the measuring point on the surface of the object) between the amounts of displacement $(X_1,Y_1)$ of the object and the amounts of displacement $(X_2,Y_2)$ of the objective lens can be measured with good precision.

A $\lambda/4$ plate 41, a polarizing prism 42 and a corner-cube prism 43 guide the light to the mirrors 38 and 39 twice, respectively. This construction allows slight inclination of the mirrors 38 and 39.

On the other hand, when the surface of the object is not smooth but optically coarse, the method of the second embodiment is not suitably applied. This is because the reflected light is diffracted in various directions on the optically coarse surface, so alignment between the optical paths of the incident and reflected light components cannot be achieved. However, according to the method of the first embodiment, when the NA of the objective lens becomes large and the angular aperture $\alpha$ becomes larger while the measuring light is incident at a width substantially corresponding to the aperture of the objective lens, part of the reflected light can be incident on the objective lens unless the shape of a portion illuminated by the measuring light is given such that the surface of the portion at every point is inclined at an angle $\theta$. Therefore, the beat frequency can be detected.

For example, when the surface shape of a lens is measured, the reflectance of glass is about 4%. For this reason, a high-power laser beam must be used to irradiate the surface of the object. According to an experiment, the polished glass surface which was not inclined with respect to the plane perpendicular to the optical axis of the lens could be measured when a laser beam with a power of 0.5 mW was used.

However, when poor surface smoothness, large surface inclination and low surface reflectance are given, the amount of light reflected by the surface of the object is small and proper measurement cannot be performed. In order to prevent this drawback, it is preferred that the detection sensitivity of the photodetector is increased, and that a high-power laser is used. In this embodiment, a stabilized transverse Zeeman laser having a power of 2.5 mW is used.

When the object to be measured comprises a rotationally symmetric object such as an aspherical lens, it is often convenient to measure cylindrical coordinates (R-$\phi$-Z) having the Z-axis as the center of rotation. In other words, the coordinates of the rotating jig mounted on a precision lathe or a grinding machine can be utilized as those of an object surface to eliminate centering.

When the angular aperture of the objective lens 6 is larger than the inclined angle $\theta$ of the surface of the object, measurement cannot be performed in principle. Since the NA (numerical aperture) of the objective lens cannot be larger than 0.6 in association with the working distance, the angular aperture must be less than 36°. It should be noted that the angular aperture is given to be $\sin^{-1}$NA and 36° for NA=0.6. Therefore, even if the above method is used, measurement cannot be performed when the surface of the object is inclined at an angle of 30° or more.

Figure 9:
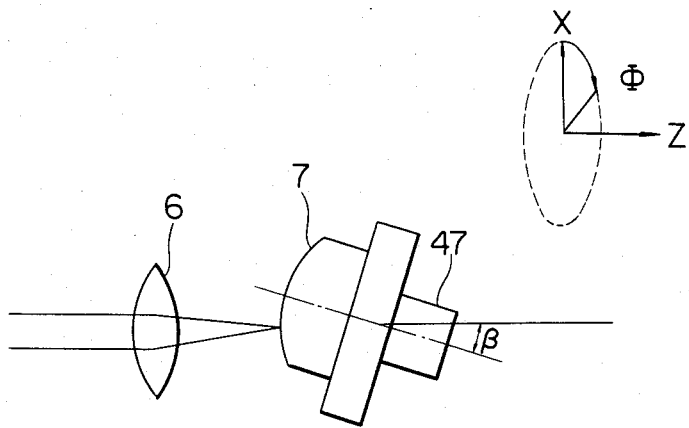
FIG. 9 is a schematic representation for explaining an object carrier of an optical measuring apparatus according to a third embodiment of the present invention.

In order to overcome this drawback according to still another embodiment of the present invention, the rotating shaft of the drive mechanism is inclined by an angle $\beta$ with respect to the rotational direction of the object, as shown in FIG. 9. Thereafter, the object is shifted along the X direction and the $\phi$ direction, and the surface of the object is measured. When the object is a rotationally symmetrical object, the coordinate X is changed from the center of the surface to its periphery and the object is rotated along the $\phi$ direction, thereby measuring the entire surface of the object. When the rotating shaft is inclined by the angle $\beta(\beta \leq \theta_1)$ where $\theta_1$ is a maximum inclined angle, an object which is inclined by an angle up to an angle $(\theta_1+\beta)$ with respect to the center of rotation can be measured. For example, when $\theta_1 = \beta = 30°$, the surface of the object can be measured at a maximum inclined angle of 60°.

The coordinate along the R direction can be measured as described above, the coordinate along the $\phi$ direction can be measured by a rotary encoder mounted in a rotating mechanism 47.

Figure 10:
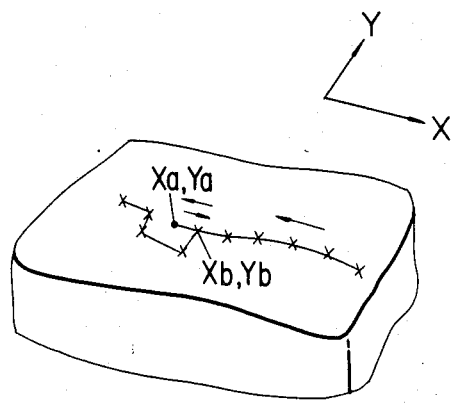
FIG. 10 is a perspective view for explaining a measuring method in the third embodiment of the present invention.

When the relative position between the object and the objective lens is shifted along the X and Y directions or the R and $\phi$ directions, the thickness of the object can be measured within the X-Y or R-$\phi$ plane. However, when the reflected light does not sufficiently return to the objective lens (i.e., when the surface is damaged at a given position or a surface portion is contaminated with dust), measurement is frequently interfered with. Measurement by the optical heterodyne method is performed by integrating a continuous change in thickness of an object. In this sense, measurement cannot be performed when surface detection becomes discrete. In order to overcome this drawback, as shown in FIG. 10, when a position given by the coordinates $(X_a,Y_a)$ cannot be measured, the immediately preceding coordinates $(X_b,Y_b)$ are subjected to measurement detection again. In other words, the measured value $Z_b$ at the preceding coordinates $(X_b, Y_b)$ is entered again, and then subsequent detection is performed by passing the coordinates $(X_a,Y_a)$. This measuring procedure can also be applied to measurement of the R-$\phi$ coordinate.

According to the present invention as described above, the optical measuring apparatus has a construction which allows direct measurement of a shape of a surface of the object by utilizing the interferometric measurement with an optical heterodyne technique. This optical measuring apparatus can overcome all conventional drawbacks which are caused by the lack of possible mechanical precision. As a result, interferometric measurement of the present invention can be performed with a precision of 0.1 to 0.01 μm so as to measure the surface shape of various objects in various inclination states, thereby providing great industrial advantages.

What is claimed is:

1. An optical measuring apparatus comprising:
   a light source for highly precisely, stably generating measuring light of a frequency $f_1$ and reference light of a frequency $f_2$;
   first optical means for focusing the measuring light on a surface of an object fixed on a carrier;
   moving means for moving said carrier along a direction perpendicular to an optical path of the measuring light;
   controlling means for controlling to keep a constant distance between an objective lens of said first optical means and the surface of the object;
   second optical means for focusing the reference light on a mirror arranged on said carrier to be substantially perpendicular to the optical path of the measuring light;
   third optical means for allowing on a first photodetector interference between the measuring light reflected by the surface of the object and transmitted through said first optical means again and the reference light reflected by said mirror and transmitted by said second optical means, whereby a beat frequency caused by the interference of reflected light components of the measuring and reference light is detected to measure the shape of the surface of the object;
   a second photodetector for receiving part of the light reflected by the surface of the object and for detecting a deviation in position or distribution of the reflected light which is caused by an inclination of the surface of the object with respect to a plane perpendicular to the optical axis of said objective lens; and
   driving means, responsive to an error signal obtained from said second photodetector, for moving one of said objective lens and said light source along a direction perpendicular to the optical axis, thereby substantially aligning the optical path of the light reflected by the surface of the object with that of the light incident thereon.

2. An apparatus according to claim 1, wherein a diameter of rays of the measuring light before becoming incident on said objective lens is smaller than an entrance pupil diameter of said objective lens.

3. An apparatus according to claim 1, further comprising means for subtracting a measured value of a vertical displacement of said objective lens along the optical axis thereof from a measured value of a vertical displacement of the object along the optical axis of said objective lens.

* * * * *